United States Patent
Tiu, Jr. et al.

(10) Patent No.: US 9,600,453 B2
(45) Date of Patent: *Mar. 21, 2017

(54) MULTIMEDIA AGGREGATION IN AN ONLINE SOCIAL NETWORK

(75) Inventors: William K. Tiu, Jr., San Francisco, CA (US); Jeffrey J. Roberto, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/719,793

(22) Filed: Mar. 8, 2010

(65) Prior Publication Data

US 2010/0162375 A1  Jun. 24, 2010

Related U.S. Application Data

(63) Continuation of application No. 11/682,678, filed on Mar. 6, 2007, now Pat. No. 7,680,882.

(51) Int. Cl.

| | |
|---|---|
| *G06F 15/16* | (2006.01) |
| *G06F 17/22* | (2006.01) |
| *H04L 12/58* | (2006.01) |
| *G06F 17/30* | (2006.01) |
| *H04L 29/08* | (2006.01) |

(52) U.S. Cl.
CPC ...... *G06F 17/2247* (2013.01); *G06F 17/3089* (2013.01); *H04L 29/08* (2013.01); *H04L 51/10* (2013.01); *H04L 51/32* (2013.01); *H04L 12/588* (2013.01); *H04L 12/5845* (2013.01)

(58) Field of Classification Search
USPC .............. 715/201, 203, 204, 234, 235, 236; 709/203, 217
See application file for complete search history.

(56) References Cited

U.S. PATENT DOCUMENTS

| | | |
|---|---|---|
| 5,841,970 A | 11/1998 | Tabuki |
| 6,125,385 A | 9/2000 | Wies et al. |
| 6,269,369 B1 | 7/2001 | Robertson |
| 6,360,249 B1 | 3/2002 | Courts et al. |
| 6,484,150 B1 | 11/2002 | Blinn et al. |
| 6,641,037 B2 | 11/2003 | Williams |
| 6,751,778 B1 | 6/2004 | Broman et al. |
| 6,799,199 B1 | 9/2004 | Segal et al. |
| 6,925,595 B1 | 8/2005 | Whitledge et al. |
| 6,963,850 B1 | 11/2005 | Bezos et al. |

(Continued)

OTHER PUBLICATIONS

Office Action dated Jun. 8, 2009 in U.S. Appl. No. 11/682,678.

(Continued)

*Primary Examiner* — Michael Y Won
(74) *Attorney, Agent, or Firm* — Baker Botts L.L.P.

(57) ABSTRACT

Multimedia content is featured on user pages of an online social network using embed codes that are generated using a configuration file associated with the source ID for the multimedia content and a content ID for the multimedia content. The configuration file, the source ID and the content ID are stored locally by the online social network so that any changes to the embed codes can be made by changing the configuration file associated with the source and regenerating the embed codes. By managing multimedia content in this manner, greater control can be exercised by the online social network over the multimedia content that are featured on its user pages.

22 Claims, 6 Drawing Sheets

(56) References Cited

U.S. PATENT DOCUMENTS

| | | | |
|---|---|---|---|
| 7,021,534 B1 | 4/2006 | Kiliccote | |
| 7,068,680 B1 | 6/2006 | Kaltenmark et al. | |
| 7,069,308 B2 | 6/2006 | Abrams | |
| 7,069,310 B1 | 6/2006 | Bartholomew | |
| 7,072,683 B2* | 7/2006 | King et al. | 455/550.1 |
| 7,095,871 B2 | 8/2006 | Jones | |
| 7,117,254 B2 | 10/2006 | Lunt | |
| 7,188,153 B2 | 3/2007 | Lunt | |
| 7,197,544 B2 | 3/2007 | Wang | |
| 7,200,818 B2 | 4/2007 | Becker | |
| 7,372,976 B2 | 5/2008 | Rhoads | |
| 7,594,258 B2 | 9/2009 | Mao | |
| 7,603,615 B2 | 10/2009 | Lee | |
| 7,606,865 B2* | 10/2009 | Kumar et al. | 709/206 |
| 7,634,466 B2* | 12/2009 | Rose | G06F 17/30616 |
| 7,636,779 B2* | 12/2009 | Hayashi et al. | 709/224 |
| 7,647,306 B2 | 1/2010 | Rose | |
| 7,680,804 B2 | 3/2010 | Upendran | |
| 7,680,882 B2* | 3/2010 | Tiu et al. | 709/203 |
| 7,685,198 B2* | 3/2010 | Xu et al. | 707/748 |
| 7,689,682 B1 | 3/2010 | Eldering | |
| 7,698,380 B1* | 4/2010 | Amidon et al. | 709/218 |
| 7,720,835 B2 | 5/2010 | Ward | |
| 7,734,631 B2 | 6/2010 | Richardson | |
| 7,769,819 B2 | 8/2010 | Lerman | |
| 7,769,827 B2 | 8/2010 | Girouard | |
| 7,788,183 B2* | 8/2010 | Romney | 705/65 |
| 7,788,260 B2 | 8/2010 | Lunt | |
| 7,801,879 B2 | 9/2010 | Jones | |
| 7,866,000 B2 | 1/2011 | Lee | |
| 7,886,000 B1* | 2/2011 | Polis et al. | 709/203 |
| 7,925,973 B2* | 4/2011 | Allaire et al. | 715/248 |
| 7,954,058 B2 | 5/2011 | Kalaboukis | |
| 7,962,948 B1 | 6/2011 | Girouard | |
| 8,010,460 B2 | 8/2011 | Work | |
| 8,060,405 B1 | 11/2011 | Lawrence | |
| 8,060,463 B1 | 11/2011 | Spiegel | |
| 8,069,414 B2 | 11/2011 | Hartwig | |
| 8,117,545 B2 | 2/2012 | Rosenbaum | |
| 8,132,103 B1 | 3/2012 | Chowdhury | |
| 8,135,610 B1 | 3/2012 | Bryce | |
| 8,150,979 B1 | 4/2012 | Oldham | |
| 8,156,176 B2 | 4/2012 | Lerman | |
| 8,166,058 B2 | 4/2012 | Xu | |
| 8,209,380 B2 | 6/2012 | Tiu | |
| 8,214,457 B2 | 7/2012 | Tiu | |
| 8,219,134 B2 | 7/2012 | Maharajh | |
| 8,250,616 B2 | 8/2012 | Davis | |
| 8,260,882 B2* | 9/2012 | Kim | G06Q 10/10 709/217 |
| 8,307,392 B2 | 11/2012 | Ahanger | |
| 8,316,237 B1 | 11/2012 | Felsher | |
| 8,484,203 B1 | 7/2013 | Clancy | |
| 8,781,892 B2 | 7/2014 | Martinez | |
| 2002/0059201 A1 | 5/2002 | Work | |
| 2002/0091770 A1 | 7/2002 | Takakura et al. | |
| 2002/0103789 A1 | 8/2002 | Turnbull et al. | |
| 2002/0131561 A1 | 9/2002 | Gifford | |
| 2002/0138728 A1 | 9/2002 | Parfenov | |
| 2002/0138843 A1 | 9/2002 | Samaan | |
| 2003/0014483 A1 | 1/2003 | Stevenson et al. | |
| 2003/0061294 A1 | 3/2003 | Stennicke | |
| 2003/0079120 A1 | 4/2003 | Hearn | |
| 2003/0191828 A1 | 10/2003 | Ramanathan | |
| 2004/0088325 A1 | 5/2004 | Elder | |
| 2004/0215793 A1 | 10/2004 | Ryan | |
| 2005/0027820 A1 | 2/2005 | O'Laughlen | |
| 2005/0171955 A1 | 8/2005 | Hull | |
| 2005/0216300 A1* | 9/2005 | Appelman et al. | 705/1 |
| 2005/0222987 A1 | 10/2005 | Vadon | |
| 2006/0008256 A1 | 1/2006 | Khedouri | |
| 2006/0021009 A1 | 1/2006 | Lunt | |
| 2006/0028689 A1 | 2/2006 | Perry | |
| 2006/0117378 A1 | 6/2006 | Tam | |
| 2006/0143183 A1 | 6/2006 | Goldberg | |
| 2006/0167860 A1 | 7/2006 | Eliashberg et al. | |
| 2006/0200355 A1 | 9/2006 | Sideman | |
| 2006/0208844 A1 | 9/2006 | Kubo | |
| 2006/0259589 A1 | 11/2006 | Lerman | |
| 2006/0294134 A1 | 12/2006 | Berkhim | |
| 2007/0022437 A1 | 1/2007 | Gerken | |
| 2007/0038567 A1 | 2/2007 | Allaire | |
| 2007/0192703 A1 | 8/2007 | Unz | |
| 2007/0214180 A1 | 9/2007 | Crawford | |
| 2007/0220575 A1 | 9/2007 | Cooper et al. | |
| 2007/0255785 A1 | 11/2007 | Hayashi | |
| 2007/0270188 A1 | 11/2007 | Gupta et al. | |
| 2008/0005125 A1* | 1/2008 | Gaedeke | 707/10 |
| 2008/0005282 A1* | 1/2008 | Gaedcke | 709/219 |
| 2008/0034060 A1 | 2/2008 | Fisher, Jr. | |
| 2008/0052371 A1 | 2/2008 | Partovi | |
| 2008/0071929 A1* | 3/2008 | Motte et al. | 709/246 |
| 2008/0082904 A1 | 4/2008 | Martinez | |
| 2008/0082905 A1 | 4/2008 | Martinez | |
| 2008/0098032 A1 | 4/2008 | Wu | |
| 2008/0103879 A1 | 5/2008 | Armstrong | |
| 2008/0103907 A1 | 5/2008 | Maislos | |
| 2008/0163059 A1 | 7/2008 | Craner | |
| 2008/0163317 A1 | 7/2008 | Mills | |
| 2008/0177860 A1 | 7/2008 | Khedouri | |
| 2008/0189617 A1 | 8/2008 | Covell et al. | |
| 2008/0195712 A1 | 8/2008 | Lin | |
| 2008/0208963 A1 | 8/2008 | Eyal | |
| 2008/0214180 A1 | 9/2008 | Cunningham | |
| 2008/0215426 A1 | 9/2008 | Guldimann | |
| 2008/0222199 A1* | 9/2008 | Tiu et al. | 707/104.1 |
| 2008/0222535 A1 | 9/2008 | Zrike | |
| 2008/0235589 A1 | 9/2008 | Shaw | |
| 2008/0244038 A1 | 10/2008 | Martinez | |
| 2008/0271098 A1 | 10/2008 | Kalaboukis | |
| 2008/0317439 A1 | 12/2008 | Wong | |
| 2009/0006192 A1 | 1/2009 | Martinez | |
| 2009/0049122 A1 | 2/2009 | Wayne | |
| 2009/0063619 A1* | 3/2009 | Chijiiwa | 709/203 |
| 2009/0063973 A1 | 3/2009 | Payton | |
| 2009/0070412 A1 | 3/2009 | D'Angelo | |
| 2009/0150947 A1 | 6/2009 | Soderstrom | |
| 2009/0164271 A1 | 6/2009 | Johnson | |
| 2009/0271247 A1 | 10/2009 | Karelin | |
| 2009/0319518 A1 | 12/2009 | Koudas | |
| 2010/0094728 A1 | 4/2010 | Denning | |
| 2010/0162375 A1 | 6/2010 | Tiu | |
| 2010/0312644 A1 | 12/2010 | Borgs | |
| 2011/0055249 A1 | 3/2011 | Consuegra | |
| 2011/0158605 A1 | 6/2011 | Bliss | |
| 2012/0304050 A1 | 11/2012 | Tiu, Jr. | |
| 2012/0323903 A1 | 12/2012 | Tiu, Jr. | |
| 2014/0229835 A1 | 8/2014 | Ravine | |

OTHER PUBLICATIONS

U.S. Appl. No. 13/178.271, filed Jul. 7, 2011, Tiu.
U.S. Appl. No. 13/337,829, filed Dec. 27, 2011, Tiu.
Hill, W., et al., "Recommending and Evaluating Choices in a Virtual Community of Use," Proceedings of CHI, http://www1.acm.org/sigs/sigchi/chi95/Electronic/documnts/papers/wch_bdy.htm, 1995.
U.S. Appl. No. 13/338,046, filed Dec. 27, 2011, Tiu.
U.S. Appl. No. 13/338,115, filed Dec. 27, 2011, Tiu.
U.S. Appl. No. 13/478,019, filed May 22, 2012, Tiu.
U.S. Appl. No. 13/843,776, filed Mar. 15, 2013, Tiu, Jr.
U.S. Appl. No. 13/861,270, filed Apr. 11, 2013, Tiu, Jr.
U.S. Appl. No. 13/595,547, filed Aug. 27, 2012, Tiu.
U.S. Appl. No. 13/930,992, filed Jun. 28, 2013, Tiu.

* cited by examiner

MULTIMEDIA AGGREGATION IN AN ONLINE SOCIAL NETWORK

CROSS-REFERENCE TO RELATED APPLICATIONS

This application is a continuation of application Ser. No. 11/682,678, filed on Mar. 6, 2007.

BACKGROUND OF THE INVENTION

Field of the Invention

The present invention generally relates to processing of online social network data, and more particularly, to a method and system for managing multimedia content appearing on user pages of an online social network.

Description of the Related Art

Over the past several years, the amount of multimedia content available online has increased dramatically. With access to cheap storage and higher bandwidths, photo sharing sites and video sharing sites have become widely used. Sharing personal photos with families and friends through one of these photo sharing sites is now commonplace. The explosion in video sharing is not so much attributable to the sharing of personal video created by the user but the sharing of video created by another person that the user finds particularly funny, interesting or informative.

Video sharing is often done through e-mail. Typically, after viewing a video, the user inputs e-mail addresses of those persons with whom the user would like to share the video. In response, the video sharing site sends an e-mail to such persons with a hyperlink to the video. The person receiving the e-mail can access the hyperlink to view the video and share the video with other persons in the same manner. Video viewership can increase very rapidly in this manner.

A less intrusive way of sharing video is through a profile or landing page a user maintains at an online social network. When a user finds a video that is particularly funny, interesting or informative, the user features that video on his or her landing page at the online social network. As people visit the user's landing page at the online social network, they can watch the video from the user's landing page although the actual video feed is from a third party source.

As more and more users at online social networks feature videos and other multimedia content on their landing pages, the task of managing them has become a challenge to online social networks. One major reason for the difficulty in managing such multimedia content is that much of it are not stored locally by the online social networks but are streamed from servers that host the multimedia content when they are accessed for viewing.

SUMMARY OF THE INVENTION

The present invention provides a method and system for managing multimedia content that appear on various user pages of an online social network. According to embodiments of the present invention, when multimedia content from a third party source is selected by a user to be featured on his or her profile or landing page, source ID and content ID corresponding to the featured multimedia content are stored locally in a database managed by the online social network, and an embed code for accessing the featured multimedia content is generated using the source ID and the content ID. The source ID is an identifier of the third party source of the multimedia content and is associated with a configuration file that is used in generating the embed code. The content ID is an identifier for the multimedia content used by the third party source and is used as an input parameter when generating the embed code with the configuration file.

By managing multimedia content in accordance with embodiments of the present invention, greater control can be exercised by the online social network over the multimedia content that are featured in the landing pages of its users. For example, inappropriate content can be filtered easily by searching for the source ID and content ID corresponding to the inappropriate content and flagging them so that the embed code for such content will not be generated. Blocking an entire site is even easier. It just requires a change to the configuration file corresponding to that site so that a web page displaying a message such as "Access to the URL ****.com is not permitted." can be generated in place of the embed code. As another example, invalid links that are caused by URL changes implemented by the source of the multimedia content can be fixed easily by making the appropriate correction to such source's configuration file. After the correction is made to the configuration file, all embed codes generated using this configuration, file will have the correct URL.

A first embodiment of the present invention is directed to a method for generating a web page, e.g., a landing page of a user of an online social network, that includes a multimedia section in which multimedia content from a third party source can be displayed. The method includes the steps of receiving a user selection of multimedia content of a third party source that is to be added to the multimedia section, storing a source ID associated with the third party source, storing a content ID associated with the multimedia content, generating an embed code for the multimedia content using the source ID and the content ID, and generating the web page including the multimedia section using the embed code. The embed code may be generated by executing a configuration file associated with the source ID, wherein the configuration file specifies the format of the embed code and the location of the third party source (e.g., its URL) associated with the source ID.

A second embodiment of the present invention is directed to a method for generating a web page for a user of the online social network, e.g., the user's landing page, based on third party multimedia content aggregated by other users of the online social network. The method includes the steps of retrieving source IDs and content IDs of multimedia content aggregated by other users of the online social network, selecting at least one multimedia content aggregated by the other users of the online social network, generating an embed code for the selected multimedia content using its source ID and the content ID, and generating the web page using the embed code. The embed code may be generated by executing a configuration file associated with the source ID, wherein the configuration file specifies the format of the embed code and the location of the third party source associated with the source ID. The multimedia content may be selected based on its popularity with other users of the online social network who are related to the user of the online social network by N degrees of separation or less.

A third embodiment of the present invention is directed to a web server computer for an online social network. The web server computer includes a local database that stores content for a plurality of users of the online social network, the content for each of the users including profile information and pointers to third party multimedia content, and a processing unit that is programmed to generate a landing page for each of the users with the profile information and at least one pointer to third party multimedia content. Each of the pointers to third party multimedia content includes a source ID associated with a source of the third party multimedia content and a content ID associated with the third party multimedia content, and the landing page includes an embed code for the third party multimedia content that is generated using the source ID and the content ID.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
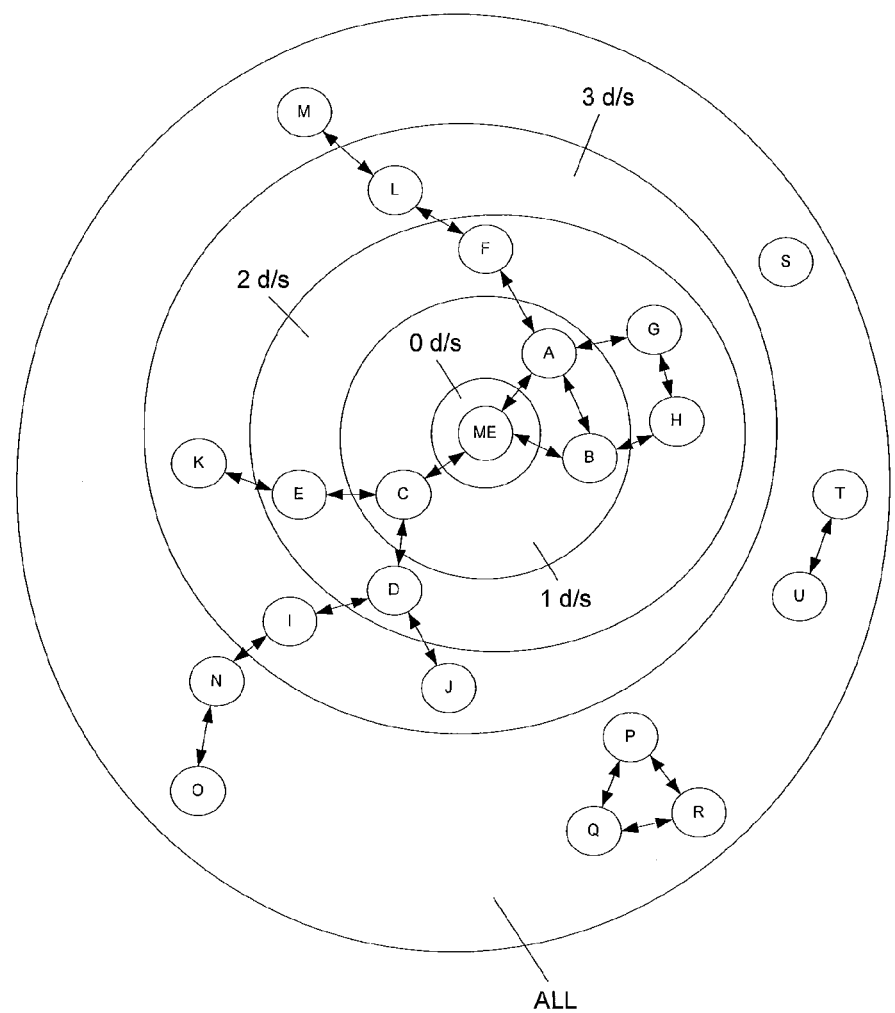
FIG. 1 is a diagram that graphically represents the relationships between users of an online social network.

FIG. 1 is a graph representation of a social network centered on a given individual (ME). Other users of this social network include A-U whose position, relative to ME's, is referred to by the degree of separation between ME and each other user. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
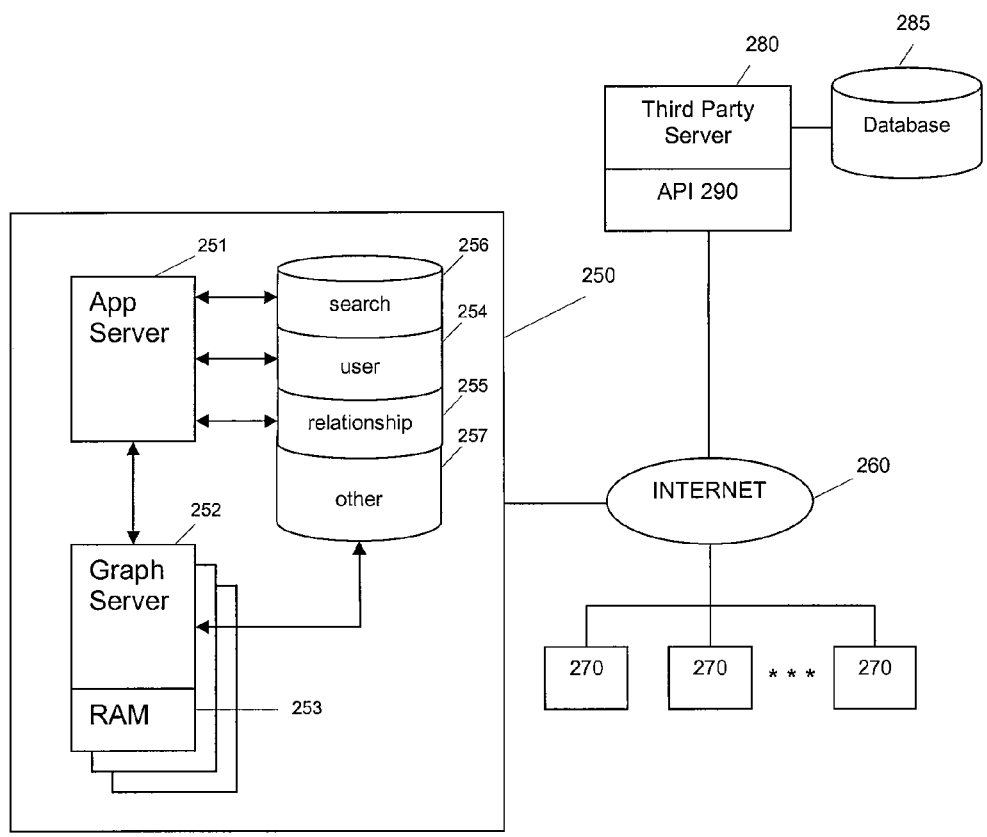
FIG. 2 is a block diagram illustrating components of a system for managing an online social network and connections to this system from a third party server and client computers.

FIG. 2 is a block diagram illustrating a system 250 for creating and managing an online social network. The system 250 represents one example embodiment of a system for creating and managing an online social network, and includes an application server 251 and one or more graph servers 252. As known in the art, a server is a computer having a processing unit and system memory that is programmed to carry out certain functions. The system 250 is connected to a network 260, e.g., the Internet, and accessible over the network by a plurality of remote computers (only three of which are shown), collectively designated as 270, and a third party server 280 that manage its user database 285 and communicate with the system 250 through an application programming interface (API) 290 provided by the system 250. The system 250 is connected to other third party servers (some of which communicate with the system 250 through APIs provided by the system 250) but, for simplicity, they are not shown in FIG. 2.

The application server 251 manages a user database 254, a relationship database 255, a search database 256, and other databases 257. The user database 254 contains profile information for each of the user in the online social network managed by the system 250. The profile information may include, among other things: a unique user identifier (user ID), name, age, gender, location, hometown, references to image files, listing of interests, attributes, and the like. The user database 254 also contains information about groups (e.g., organizations, school alumni associations, family, etc.) that users have defined. The group information may include, among other things: a unique group identifier (group ID), name, description of the group, and members of the group. The relationship database 255 stores for each user, the user IDs of all users with whom the user has a direct relationship, i.e., direct friends of the user who are users of the online social network. In addition, the contents of the user database 254 are indexed and optimized for search, and stored in the search database 256. The other databases 257 may include a multimedia content database and a database for storing testimonials and various other information commonly stored in online social networks and communities. The user database 254, the relationship database 255, the search database 256, and the other databases 257 are updated to reflect inputs of new user information and edits of existing user information that are made through the remote computers 270.

The application server 251 also manages the information exchange requests that it receives from the remote computers 270 over the Internet. The graph servers 252 receive a query from the application server 251, process the query and return the query results to the application server 251. The graph servers 252 manage a representation of the social network for all users in the member database. The graph servers 252 have a dedicated memory device 253, such as a random access memory (RAM), in which an adjacency list that indicates all first degree relationships in the social network is stored. The graph servers 252 respond to requests from application server 251 to identify relationships and the degree of separation between users of the online social network. The application server 251 is further configured to receive data feeds, e.g., RSS feeds, from a third party server 280 through an application programming interface (API) 290 that third parties may use to send data to the application server 251 for storage in one of the databases managed by the application server 251.

In the embodiments of the present invention described below, users are respectively operating the remote computers 270 that are programmed to execute web browser programs, and access the web pages managed by the application server 251 using the web browser programs. The web pages that are displayed to a user are transmitted from the application server 251 to that user's remote computer and processed by the web browser program stored in that user's remote computer for display through the monitor of that user's remote computer.

Figure 3:
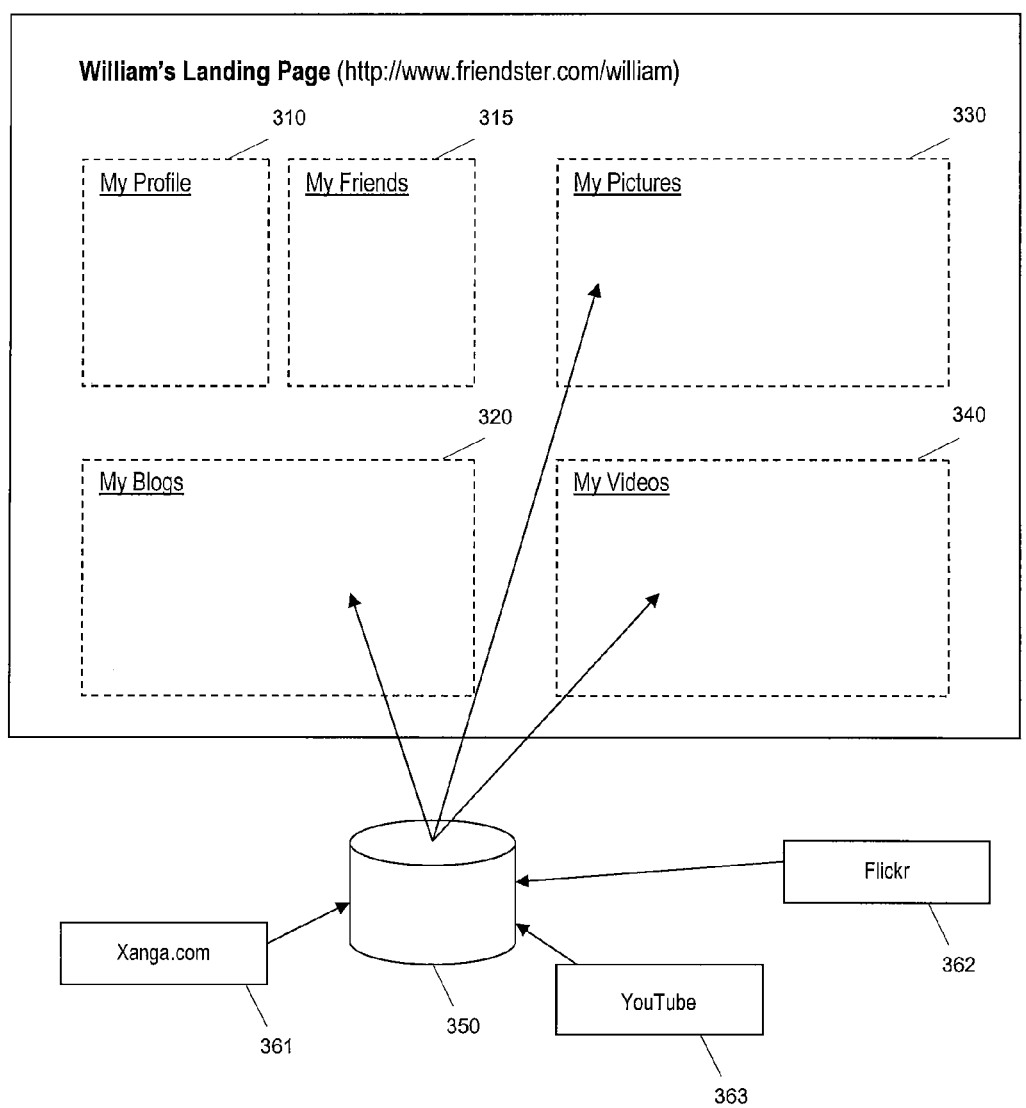
FIG. 3 is a schematic illustration of an example of a landing page for a particular user and external content sources for the landing page.

FIG. 3 schematically illustrates a web page that functions as a profile or landing page for a particular user in an online social network and external content sources for the landing page. This landing page can be accessed several ways. First, it can be accessed from within the online social network by the user when the user logs into the online social network and navigates to this web page or by other users who clicks on a user ID or an image associated with this user. Second, it can be accessed directly by typing in the associated URL into a web browser. Third, this page may be opened up to web crawlers of search engines and accessed when a user clicks on a search result that is hyperlinked to this page.

The web page shown in FIG. 3 includes multiple sections that contain different categories of content associated with the user. The user's profile information is provided in section 310. A list of the user's friends in the online social network and hyperlinks to their landing pages are provided in section 315. Section 320 displays the user's blog. In this example, the user is maintaining a blog at an external web site 361, e.g., Xanga.com, and the content of his or her blog is supplied from the external web site using an RSS feed. In a similar manner, the content of the user's pictures that is displayed in section 330 is supplied from an external web site 362 (e.g., Flickr) using an RSS feed, and the content of the user's videos that is displayed in section 340 is supplied from an external web site 363 (e.g., YouTube) using an RSS feed.

As a way to minimize the number of times an external web site is accessed for the necessary RSS feeds, all RSS feeds from external web sites are stored in a cache storage unit 350. All RSS feeds are also assigned a minimum lifetime and a maximum lifetime. When a landing page of a user is accessed and the landing page contains sections that rely on RSS feeds, the lifetime of each such RSS feed is checked. If it is below its minimum lifetime, the last cached version of the RSS feed is accessed. If it has exceeded the minimum lifetime, a query is issued to the external web site for the latest information. On a global basis, whenever an RSS feed reaches its maximum lifetime, a query is issued to the external web site for the latest information.

The query that is issued to an external web site for content associated with a user includes the user ID and password of that user as proof that access to the user's account maintained by the external web site is authorized. The user ID and password are provided by the user when the user sets up his or her landing page to retrieve content from external web sites through RSS feeds. The issued query is kept hidden at the user level and preferably encoded or encrypted so that the user ID and password contained in the query can be kept confidential.

Figure 4:
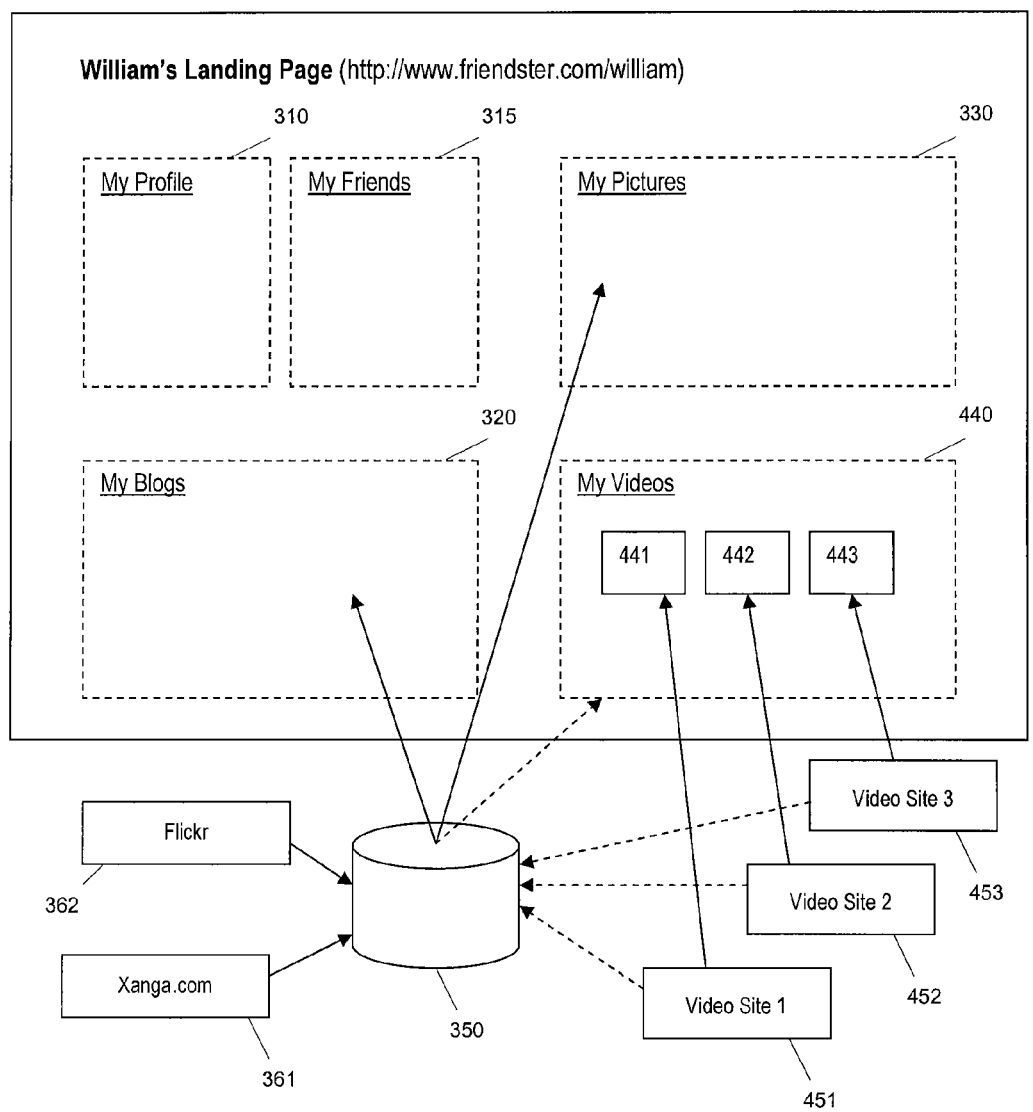
FIG. 4 is a schematic illustration of a user landing page that has been generated in accordance with an embodiment of the present invention.

FIG. 4 schematically illustrates a user landing page that has been generated in accordance with an embodiment of the present invention. The web page depicted in FIG. 4 is the same as the web page depicted in FIG. 3 except that the user video section is generated differently. In the embodiment of FIG. 4, the videos that are featured in section 440 are not stored in the cache storage unit 350 but are streamed in from an external, third party source. Thus, when a user clicks on a video thumbnail image 441, 442, or 443 to view the video, the video is not supplied from the cache storage unit 350 but is streamed directly from a corresponding one of external video sites 451, 452, 453. The direct streaming from the external video sites 451, 452, 453 is enabled using embed codes having the following general format:
<embed src="http://videosite.com/vid.swf?id=12345"></embed>.

The embed codes that enable direct streaming from the external video sites 451, 452, 453 are typically made available by the external video sites 451, 452, 453 for pasting into the HTML file corresponding to a user's landing page, such as the one shown in FIG. 4. The process may even be automated so that the embed code is automatically pasted into the HTML file corresponding to a user's landing page. This would occur, for example, when a user visits an external video site, views a video at the external video site, and indicates that he or she would like to add the video to his or her landing page at an online social network.

In the embodiments of the present invention, embed codes for video files are generated from a source ID (which identifies the external source of the video file) and a content ID (which is an identifier of the video file used by the external source) using configuration files having the following general format:
videosite=<embed src="http://videosite.com/vid.swf?id=%ID%"></embed>.

The parameter "% ID %" signifies a variable field into which the content ID is inserted. The source ID points to the configuration file to use, because different configuration files are provided for different external video sites. For example, each of videosite1, videosite2 and videosite3 has its own configuration file, as shown below:
videosite1=<embed src="http://videosite1.com/vid.swf?id=%ID%"></embed>
videosite2=<embed src="http://videosite2.com/vid.swf?id=%ID%"></embed>
videosite3=<embed src="http://videosite3.com/vid.swf?id=%ID%"></embed>
As an example, if the source ID="videosite3" and the content ID="51515" for a video file, the embed code corresponding to that video file would be generated as:
<embed src="http://videosite3.com/vid.swf?id=51515"></embed>.

Figure 5:
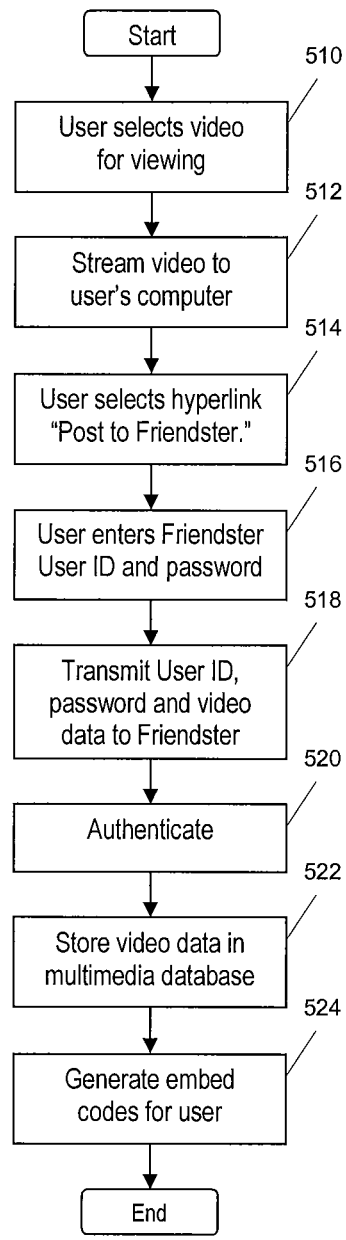
FIG. 5 is a flow diagram that illustrates the steps carried out to generate a web page that includes embed codes for multimedia content.

FIG. 5 is a flow diagram that illustrates the steps carried out to generate an HTML file that includes embed codes for the user's videos. In the flow diagram of FIG. 5, steps 510-518 are carried out by the server computer of the external video site and steps 520-524 are carried out by the server computer of the online social network. Referring back to FIG. 2, the server computer of the online social network corresponds to the system 250 and the server computer of the external video site corresponds to the third party server 250 connected to a database 285 and configured with an API 290 that is provided by the online social network.

In step 510, the user navigates to an external video site and selects a video for viewing. In response to this selection, the video is streamed to the user's computer and displayed to the user (step 512). The user's display includes a hyperlink "Post to Friendster." This hyperlink permits the user to feature this video on the user's landing page at the online social network, Friendster. In step 514, the user selects the hyperlink "Post to Friendster." In response to this selection, the user is prompted in step 516 for user ID and password corresponding to the user's account at the online social network. Upon submission of this information, the external video site transmits this information along with the particulars of the video file, such as the source ID (which identifies the external video site that is hosting the video file) and the content ID (which is an identifier of the video file used by the external video site) to the online social network, and various other data (step 518). Steps 516 and 518 are carried out using the API 290 provided by the online social network.

In step 520, the online social network authenticates the user ID against the password using the information stored in its user database. If the user ID is authenticated, i.e., the password matches the password for the user ID stored in the user database, the particulars of the video file are stored in the multimedia content database of the online social network along with the user ID (step 522). The following table conceptually illustrates the arrangement of the data that is stored in the multimedia content database.

| User ID | Source ID  | Content ID | Thumbnail  | Tags          | Description                                      |
|---------|-----------|------------|------------|---------------|--------------------------------------------------|
| William | videosite1 | 12345      | video1.jpg | funny, dogs   | A compilation showing a number of funny dog tricks. |
| William | videosite2 | 12345      | video2.jpg | tennis        | An incredible shot executed by Roger Federer.    |
| William | videosite3 | 51515      | video3.jpg | food, contest | Hot dog eating contest held in Honolulu, HI in 2006. |
| Jeff    | videosite2 | 33221      | video4.jpg | soccer        | A compilation of incredible soccer moments.      |

In the table shown above, each row represents data associated with a single video file. "Source ID" indicates the external video site that is hosting this video file and identifies the configuration file to be used in generating the embed code for this video file. "Content ID" indicates the unique ID used by the external video site to identify this video file and is used as an input parameter when generating the embed code for this video file. "Thumbnail" indicates the memory location of the thumbnail image corresponding to this video file. One or more entries under "Tags" indicate descriptive keywords associated with this video file. The entry under "Description" provides a brief description of the content of this video file. The particulars of the video file that are transmitted from the external video site to the online social network are controlled by the API 290.

When a landing page of a user, such as the one shown in FIG. 4, is generated, it is generated from an HTML file corresponding to the landing page that is stored in the cache storage unit 350. This HTML file includes embed codes corresponding to any third party video that is featured by the user in section 440. In step 524, the embed codes corresponding to the featured third party videos are generated and inserted into the HTML file corresponding to user's landing page. During this generation step, the multimedia content database is checked for video file entries associated with the user that has an update flag set (i.e., equal to 1). For all video file entries that meet these conditions, the embed code corresponding to such entries will be generated using a configuration file identified by that entry's source ID and inserted into the HTML file corresponding to the user's landing page. After the generation step is carried out for the user, the update flag of all video file entries of the user is set to 0.

The generation step may be carried out on-the-fly each time the landing page of the user is requested. It is, however, preferable to carry out the generation step according to a predetermined schedule so as to conserve computational resources. For example, the generation step is not carried out when none of the video file entries associated with the user's landing page has an update flag that is equal to 1, but is carried out when there is at least one video file entry with an update flag that is equal to 1.

When a user selects a third party video for viewing from a web page within the online social network (e.g., a landing page of another user or a video search page), the user may watch the third party video at the web page within the online social network without navigating to the third party's web site. When the user does this, a hyperlink "Add to Profile" appears alongside the video display. This hyperlink permits the user to feature the video he or she is watching on the user's landing page. In response to this selection, the source ID, the content ID, and the particulars of this video file are stored in the multimedia content database of the online social network along with the user ID of this user.

Figure 6:
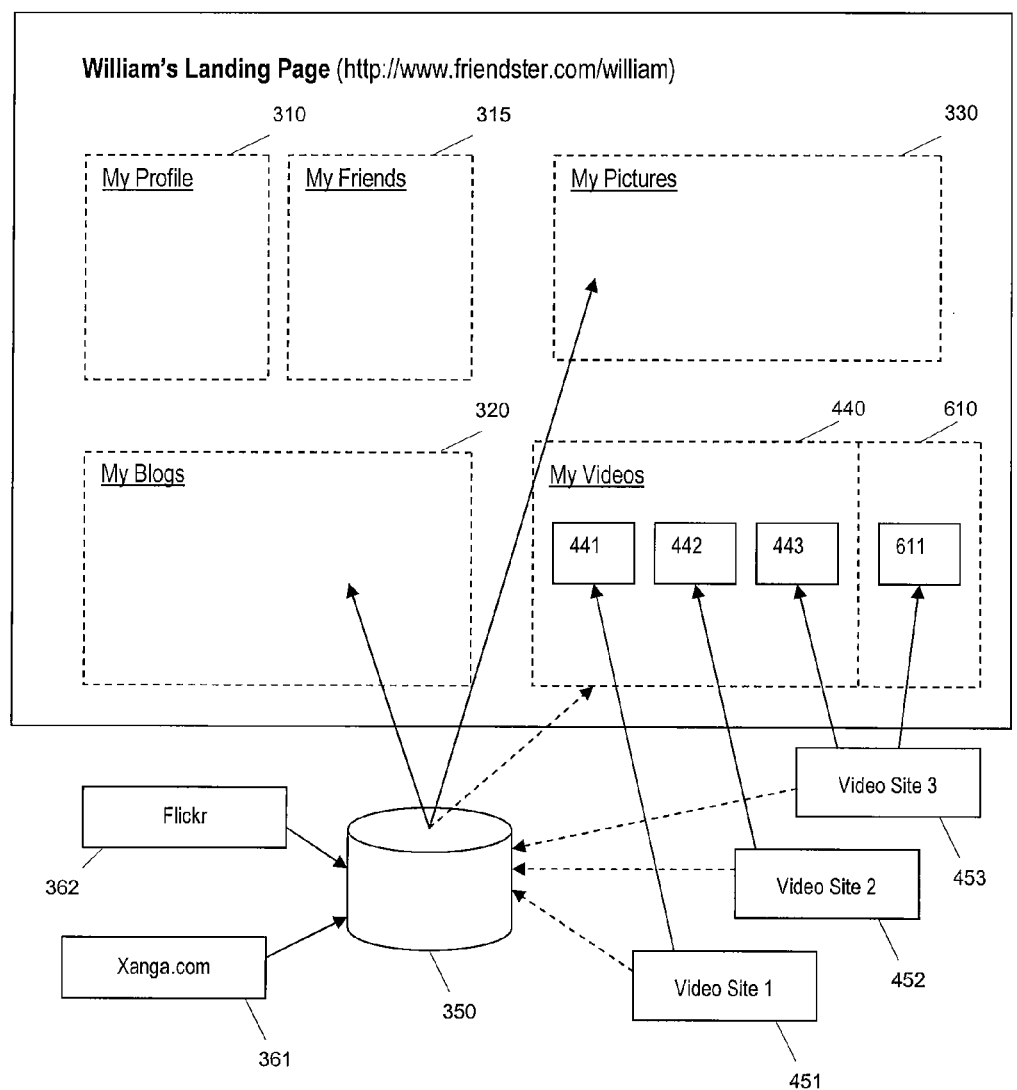
FIG. 6 is a schematic illustration of a user landing page that has been generated in accordance with another embodiment of the present invention.

FIG. 6 schematically illustrates a user landing page that has been generated in accordance with another embodiment of the present invention. The web page depicted in FIG. 6 is the same as the web page depicted in FIG. 4 except it has an additional section 610 that features one or more videos 611 that have been determined to be popular with other users of the online social network who are related to the user by N degrees of separation or less, where N is typically 1 or 2 but can be any positive integer. The videos 611 that are featured in section 610 are generated in the same manner as the videos that are featured in section 440. The differences between the featured videos in section 610 and the featured videos in section 440 are: (1) the featured location on the landing page, and (2) the decision criteria that are used by the online social network in determining whether or not to feature the video.

In the simplest implementation, a single video is featured in section 610 and this video represents the video that is the most popular with first degree friends of the user (i.e., those users who are one degree of separation away). The popularity may be based on their adoption (most often added to a landing page) or their viewership (most often viewed), or a combination of the two. When two or more videos are featured in section 610, the videos may be featured in the order of their rank with only the top N videos featured (where N can be any plural integer).

In an alternative implementation, a video's popularity with all users of the online social network, up to a predetermined degree of separation (e.g., 2, 3, or N), is considered. In this implementation, the video's popularity with first degree friends may be weighted more than the video's popularity with second degree friends, and the video's popularity with second degree friends may be weighted more than the video's popularity with third degree friends, and so forth.

By managing multimedia content in accordance with embodiments of the present invention described above, greater control can be exercised by the online social network over the multimedia content that are featured in the landing pages of its users. For example, inappropriate multimedia content can be filtered easily by searching for the source ID and content ID corresponding to the inappropriate multimedia content in the multimedia content database and flagging them so that the next time a user page that features such multimedia content is accessed, the embed code for such multimedia content will not be inserted into that user page.

As another example, an entire site can be blocked. Assuming the source ID for the site to be blocked is videosite4, this can be done by modifying the configuration file associated with that site from:
videosite4=<embed src="http://videosite4.com/vid.swf?id=%ID%"></embed>
to:
videosite4=<p> Access to the URL videosite4.com is not permitted.</p>

Invalid links that are caused by URL changes implemented by the source of the multimedia content also can be fixed easily with the embodiments of the present invention. For example, if the source of the multimedia content (source ID=videosite5) changes the URL for accessing its videos from videosite5.com/vid.swf?id=xxx to videosite5.com/en/v.swf?id=xxx, the configuration file for videosite5 is changed in a similar manner from:
videosite5=<embed src="http://videosite5.com/vid.swf?id=%ID%"></embed>
to:
videosite5=<embed src="http://videosite5.com/en/v.swf?id=%ID%"></embed>
After this change is made to the configuration file, all video file entries having source ID=videosite5 will have their update flags set to 1 so as to cause embed codes for all multimedia content from videosite5 to be regenerated when user pages that feature such multimedia content is subsequently accessed.

In the embodiments of the present invention described above, RSS feeds are described as the mechanism for transmitting content between the third party servers and the server computer of the online social network. Other types of web feeds may be employed with the present invention. Some of these examples include atom feeds and feeds based on the SOAP protocol. Also, the embed codes shown above are HTML embed codes. The present invention is, however, not limited to any particular type of embed codes, and may be practiced with embed codes for any markup language for creation of web pages.

In addition, in the embodiments of the present invention described above, video content that includes video and audio is provided as an example of the multimedia content. In general, multimedia is media that uses multiple forms of information content, and multimedia content is media content that includes multiple forms of information content.

While particular embodiments according to the invention have been illustrated and described above, those skilled in the art understand that the invention can take a variety of forms and embodiments within the scope of the appended claims.

What is claimed is:

1. A method comprising, by one or more computing systems:
accessing a social graph comprising a plurality of nodes and a plurality of edges connecting the nodes, each of one or more of the nodes being associated with one of a plurality of users of an online social network, each connection between two nodes representing a relationship between the two nodes and establishing a single degree of separation between the two nodes;
generating a web page comprising user profile information associated with a first user of the plurality of users and a link for multimedia content hosted by a third-party source that is external to the online social network, wherein the first user is associated with a first node of the plurality of nodes; the link being generated from an embed code for the multimedia content using a source ID associated with the third-party source that identifies a configuration file specifying the format of the embed code and having a variable field into which a content ID is inserted; and
sending the web page for display to one or more second users of the plurality of users, the one or more second users being associated with one or more second nodes of the plurality of node, respectively, wherein each of the second nodes is within one degree of separation of the first node, and wherein the multimedia content is retrieved using the link and displayed when the web page is rendered.

2. The method of claim 1, wherein the multimedia content comprises a blog wherein the blog is maintained at the third-party source, and the content of the blog is supplied from the third-party source to the web page.

3. The method of claim 2, wherein the content of the blog is supplied from the third-party source to the web page using an RSS feed.

4. The method of claim 1, wherein the multimedia content comprises at least one photo supplied from the third-party source.

5. The method of claim 1, wherein the multimedia content is supplied from the third-party source, and wherein each item of multimedia content supplied by the third-party source is embedded with an associated source ID and content ID.

6. The method of claim 5, wherein the multimedia content supplied by the third-party source is received through an application programming interface (API) published by the online social network.

7. The method of claim 6, further comprising authenticating a user identification and password of the multimedia content, and wherein the source ID and content ID associated with the multimedia content are locally stored after authenticating.

8. The method of claim 5, wherein the multimedia content supplied by the third-party source is associated with a user identification and password.

9. The method of claim 1, wherein the multimedia content is provided by the third-party source and selected for display based on the popularity of the multimedia content with other users of the online social network who are related to the first user by one degree of separation.

10. The method of claim 1, further comprising generating an embedded code for the multimedia content from the third-party source, wherein the embedded code specifies a URL of the third-party source.

11. The method of claim 1, wherein the multimedia content comprises at least one video supplied from the external source.

12. The method of claim 1, further comprising generating the embed code for the multimedia content.

13. The method of claim 12, wherein generating the web page comprises using the embed code to generate the link for retrieving the multimedia content.

14. The method of claim 1, wherein, when the web page is rendered, the multimedia content is directly streamed from the third-party source.

15. The method of claim 1, wherein the web page is a profile page of the online social network, the profile page being associated with the first user.

16. The method of claim 1, wherein the web page is a landing page of the online social network.

17. The method of claim 1, further comprising receiving a request from one or more of the second users to view the web page.

18. The method of claim 1, further comprising authenticating each of the second users to access the web page.

19. The method of claim 1, further comprising receiving, from the third-party source, information relating to an activation of a posting control element by the first user, wherein activation of the posting control element associates the multimedia content with a user identification corresponding to a user account of the first user on the online social network.

20. The method of claim 1, wherein the third-party source is communicably connected with the online social network.

21. The method of claim 1, wherein the one or more computing systems are servers associated with the online social network.

22. A system comprising one or more processors, the processors operable when executing instructions to:

access a social graph comprising a plurality of nodes and a plurality of edges connecting the nodes, each of one or more of the nodes being associated with one of a plurality of users of an online social network, each connection between two nodes representing a relationship between the two nodes and establishing a single degree of separation between the two nodes;

generate a web page comprising user profile information associated with a first user of the plurality of users and a link for multimedia content hosted by a third-party source that is external to the online social network, wherein the first user is associated with a first node of the plurality of nodes, the link being generated from an embed code for the multimedia content using a source ID associated with the third-party source that identifies a configuration file specifying the format of the embed code and having a variable field into which a content ID is inserted; and send the web page for display to one or more second users of the plurality of users, the one or more second users being associated with one or more second nodes of the plurality of node, respectively, wherein each of the second nodes is within one degree of separation of the first node, and wherein the multimedia content is retrieved using the link and displayed when the web page is rendered.

* * * * *